United States Patent Office 2,715,533
Patented Aug. 16, 1955

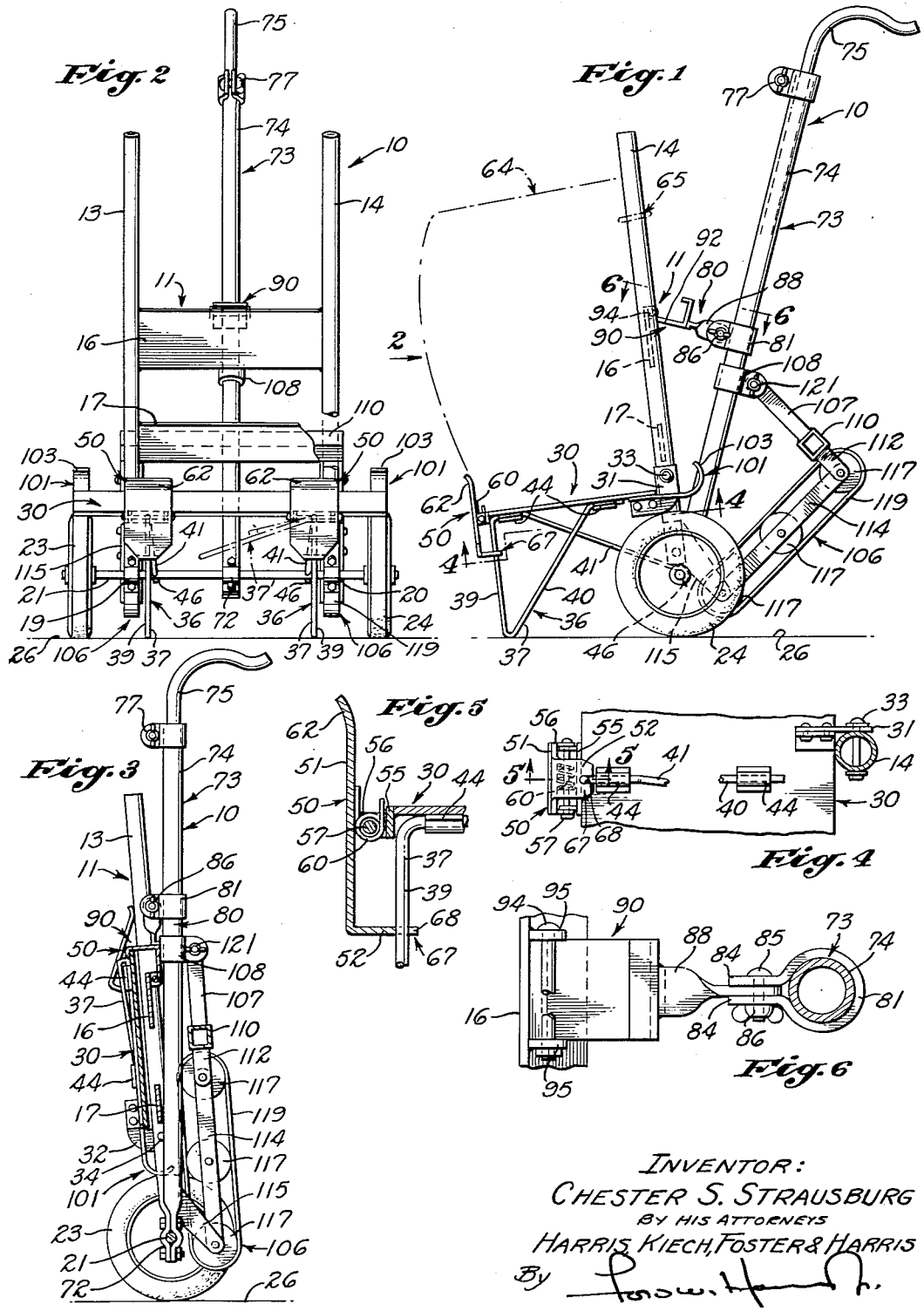

2,715,533

COLLAPSIBLE CART

Chester S. Strausburg, Los Angeles, Calif.

Application April 2, 1951, Serial No. 218,817

14 Claims. (Cl. 280—5.22)

This invention relates to carts and, more particularly, to a cart which is adapted to be collapsed to facilitate the transportation thereof to and from points of use.

In describing the structure and mode of operation of a cart constructed in accordance with my invention, it will be indicated that the cart is utilized in transporting a burden consisting of a conventional mailbag during the rounds of the postman. However, it is not intended that use of the cart be limited to the carrying of any particular burden, although the cart is particularly adapted for such use, since it is obvious that the principles of my invention could be embodied in a cart adapted for other uses.

It is a well known fact that mail carriers must carry relatively large quantities of mail in their sacks over relatively large territories and that the concomitant factors of heavy weight and large areas to be traversed result in excessive fatigue at the end of the day. In order to combat the onset of such fatigue, I provide by my invention a cart which is particularly adapted for use by a mailman because it is designed to be collapsed when transported to and from the district in which the mailman is operating and because it incorporates various features which are particularly adapted for the type of work which a mailman performs.

It is, therefore, a primary object of my invention to provide a cart which is collapsible into a relatively small compass to permit the cart to be transported to and from the point of use in public conveyances.

A conventional collapsible cart, when collapsed, sometimes inadvertently returns to its extended position, thus necessitating that the user thereof hold it in such collapsed position to prevent such inadvertent return to extended position.

Another object of my invention is the provision of a collapsible cart which includes lock means adapted to maintain the component portions of the cart in collapsed condition, thus eliminating the necessity for maintaining the cart in collapsed condition by hand.

An additional object of my invention is the provision of a collapsible cart which includes lock means for maintaining the component parts of the cart in collapsed condition, said lock means being automatically actuable when the cart is moved into said collapsed condition to engage the component parts thereof to maintain them in such collapsed condition.

An additional object of my invention is the provision of a cart of the aforementioned character which includes a frame and a maneuvering handle pivotally attached to said frame, said frame having incorporated therein lock means which is actuable by the movement of said handle into inoperative position against said frame to maintain said handle and other components of said cart in said inoperative position.

A further object of my invention is the provision of a collapsible cart which includes a pivotally mounted platform which is movable between a first, collapsed position and a second, burden-bearing position, said platform having support means associated therewith adapted to maintain the platform in a substantially horizontal plane and to support the cart when it is rested thereupon.

Another object of my invention is the provision of a cart of the aforementioned character in which the support means is pivotally secured to the under side of said platform and is movable between a first ground-contacting position and a second, retracted position.

An additional object of my invention is the provision of a cart of the aforementioned character in which the platform support means has associated therewith detent means adapted to maintain the support means in either the first, ground-contacting position or the second, retracted position.

Another object of my invention is the provision of a cart of the aforementioned character in which the detent means associated with the support means has a burden-retaining portion which is adapted to engage the lower end of a burden mounted on said platform to prevent it from being dislodged from said platform.

A further object of my invention is the provision of a cart of the aforementioned character in which the aforesaid detent means is spring biased to maintain it in positions where it will retain the support means for the platform of the cart in either the ground-contacting or retracted positions.

One of the greatest difficulties encountered in prior art collapsible carts is the fact that, when they are placed in collapsed position, they cannot be leaned against a post or seat in a vehicle in which the user thereof is riding because the wheels of the cart permit the cart to slip away and fall to the floor.

Another object of my invention is the provision of a collapsible cart which is mounted upon a plurality of ground-contacting wheels and which incorporates brake means which is automatically actuable upon the collapse of the cart to engage said wheels to prevent the rotation thereof so that the cart, when in collapsed condition, may be positioned upon said wheels and leaned against a support without the danger of the wheels rotating and permitting the cart to fall.

Another object of my invention is the provision of a cart of the aforementioned character in which the aforesaid brake means is mounted upon the platform of the cart and is movable downwardly by the pivotal movement of the platform into the first, collapsed position to engage the peripheries of the ground-contacting wheels of the cart to prevent them from rotating when the cart is in collapsed position.

A further object of my invention is the provision of a cart of the aforementioned character in which the brake means includes at least one resilient brake member fastened to the platform adjacent its rear end, said brake member being urged into engagement with the periphery of at least one of the ground-contacting wheels of the cart when the platform with which it is associated is pivoted into collapsed position.

One of the difficulties encountered with conventional carts is the fact that, when a curb or other high obstacle is approached, it is necessary to bodily lift the cart over the curb since the wheels of such carts are not usually of sufficient diameter to permit the cart to be wheeled up over the curb. Such bodily lifting of the cart and the burden deposited thereupon imposes a considerable strain upon the component portions of the cart and, also, upon the individual who must lift the cart bodily.

An additional object of my invention is the provision of a cart of the aforementioned character which includes an endless track unit adapted to facilitate the passage of the cart over vertical obstacles.

Another object of my invention is the provision of a collapsible cart of the aforementioned character in which the endless track unit is pivotally mounted upon the cart and is adapted to be moved into collapsed position when the cart is moved into collapsed position.

Other objects and advantages of my invention will be apparent from the following specification and the accompanying drawing, which is for the purpose of illustration only, and in which:

Fig. 1 is a side elevational view of a collapsible cart constructed in accordance with my invention;

Fig. 2 is a front elevational view taken in the direction of the arrow 2 of Fig. 1;

Fig. 3 is a side elevational view of the cart in collapsed position;

Fig. 4 is an enlarged, fragmentary view taken on the broken line 4—4 of Fig. 1;

Fig. 5 is a vertical, enlarged sectional view taken on the broken line 5—5 of Fig. 4; and Fig. 6 is an enlarged, fragmentary view taken from the broken line 6—6 of Fig. 1.

Referring to the drawing and particularly to Figs. 1 and 2 thereof, I show a cart 10 constructed in accordance with my invention and including a frame 11, said frame being constituted by a pair of substantially vertical spaced tubes or tubular members 13 and 14 which are maintained in operative relationship with each other by transverse stiffeners 16 and 17 formed of sheet metal or other material, the opposite ends of which are fastened to the tubes 13 and 14 by welding or other appropriate means.

Bearings 19 and 20 are fastened respectively to the lowermost ends of the tubes 13 and 14 and are adapted to journal an axle 21 on the opposite ends of which are mounted ground-engaging wheels 23 and 24. In Figs. 1–3 of the drawing, the surface of the ground is represented by the line 26.

A burden-bearing platform 30 is provided which has a substantially flat, unencumbered upper surface and which is furnished with brackets 31 and 32 at the rear end thereof which are pivotally attached, respectively, at pivot points 33 and 34 on the tubes 14 and 13 respectively. The burden-bearing platform 30 is thus movable between a first position in which it is in collapsed position against the frame 11, as best shown in Fig. 3 of the drawing, and a second, burden-bearing position in which it is disposed in substantially horizontal position, as best shown in Fig. 1 of the drawing.

Secured to the under side of the burden-bearing platform 30 is support means 36 constituted by support members 37 which have substantially vertical legs 39, the opposite ends of which are provided with angularly directed legs 40 and 41 which, as best shown in Figs. 1 and 2 of the drawing, are preferably formed of heavy gage wire stock or similar material. The angularly directed legs 41 and 42 intersect each other intermediate their lengths and have their uppermost ends pivotally suspended from the under sides of the burden-bearing platform 30 in clips 44. The angularly directed legs 41 have undulated portions 46, as best shown in Figs. 1 and 2 of the drawing, formed in their lowermost ends, said portions being adapted to the periphery of the axle 21, for a purpose which will be described in greater detail below.

The support members 37 are movable between first, extended positions in which the intersections of the lower ends of the vertical legs 39 and the angularly directed legs 40 contact the surface of the ground 26 to support the cart 10 in the position shown in Fig. 1 of the drawing and second retracted positions in which they are folded against the under side of the burden-bearing platform 30, as best shown in Fig. 3 of the drawing.

Pivotally mounted upon the forward end of the platform 30 is a pair of restraining members 50, each of the restraining members 50, as best shown in Figs. 1, 2 and 5 of the drawing, being constituted by a substantially rectangular plate 51 formed of sheet metal or similar material and having a foot portion 52 formed integrally therewith.

The pivotal mounting of each of the plates 51 is constituted by a bracket 55 mounted on the leading edge of the burden-bearing platform 30 and a mating bracket 56 provided on the plate 51, said brackets being maintained in operative relationship with each other by means of a pivot pin 57. A rat trap spring 60 encompasses the pivot pin 57 and is biased against the plate 51 to urge said plate into a position in which the foot 52 thereof is disposed beneath the under side of the burden-bearing platform 30, as best shown in Fig. 3 of the drawing. The upper portion of each of the rectangular plates 51 constitutes a restraining pad 62 adapted to prevent a mailbag 64, indicated in dotted lines in Fig. 1 of the drawing, from shifting forwardly off the platform 30 after it has been deposited thereupon. The upper portion of the mailbag is provided with rings 65 at the back thereof, said rings being disposable upon the vertical tubes 13 and 14 of the frame 11 to secure the bag upon the upper portion of the frame 11. Therefore, the restraining members 50 are movable between two positions, that is, a first position in which the rat trap spring 60 causes them to underlie the under side of the platform 30 and a second, substantially vertical position in which the restraining pads 62 at the upper portions of the rectangular plates 51 are adapted to prevent the bottom of the mailbag 64 from shifting off the platform 30.

Furthermore, when the plates 51 are in the second, vertical position detent means 67 constituted by notches 68 in the ends of the feet 52 of each of the plates 51 engage the periphery of the vertical leg 39 of each of the support members 37 to maintain said support members in their first, ground-contacting and platform supporting position. When the notches 68 in the feet 52 so engage the support members 37 the feet cannot inadvertently collapse and permit the cart to fall. As previously indicated, the ends of the angularly directed legs 41 of the support members 37 are provided with undulated portions 46 which fit over the axle 21. The engagement between the undulated portions 46 of the angularly directed legs 41 with the axle 21 serves as an auxiliary detent for maintaining the support members 37 in their vertical, ground-contacting and platform-supporting positions. When it is desired to collapse the cart 10, the upper portions of the rectangular plates 51 are pushed inwardly in a direction toward the mailbag 64 to release the notches 68 from the vertical legs 39 of the support members 37 and the undulated portions 46 at the ends of the angularly directed legs 41 are also released. The support members 37 are then pivoted upwardly against the under side of the burden-bearing platform 30 until they are substantially flush with the under side of the platform, as shown in Fig. 2 of the drawing.

After the support members have been moved upwardly against the under side of the platform 30, the restraining members 50 are urged downwardly by the action of the spring 60 so that the feet 52 thereof engage the support members 37 and hold them in their second, retracted positions. Thus, the restraining members 50 serve to maintain the support members in their extended, vertical, ground-contacting positions and also to maintain them in their second, retracted positions against the under side of the platform 30, as best shown in Fig. 3 of the drawing. The manner in which the support members 37 are pivoted upwardly against the under side of the burden-bearing platform 30 is graphically illustrated in Fig. 2 of the drawing by the dotted line 37'.

Pivotally secured to the axle 21 intermediate its ends by means of a clip 72, as best shown in Fig. 2 of the drawing, is a maneuvering handle 73, said handle being constituted by a tubular portion 74 which receives telescopically an extensible upper portion 75 which may be withdrawn from the tubular portion 74 during use and maintained at a proper height by means of an adjustable clamp 77 and which may be retracted into the tubular portion 74 during transport of the cart 10 or for other purposes. The handle 73 is movable between a first position, as best shown in Fig. 1 of the drawing, in which it is angularly disposed with reference to the frame 11 of the cart 10 and a second position in which it is collapsed against the frame 11 of the cart 10 as best shown in Fig. 3 of the drawing, to permit and facilitate transportation of said cart.

In order to facilitate the collapse and extension of the handle 73 there is provided a linkage 80 which, as best shown in Figs. 1–4 of the drawing, includes an adjustable clip 81 encircling the periphery of the tubular portion 74 of the handle 73 and having spaced legs 84 which mount a pivot pin 85 adjustable by means of a thumb nut 86. An arm 88 has one end pivotally mounted on the pivot pin 85 and its other end secured to a lock 90, said lock being constituted by a substantially L-shaped element 92 which is pivotally mounted, as best shown in Fig. 6 of the drawing, on the transverse stiffener 16 by means of a pivot pin 94 supported between ears 95 fastened to or formed integrally with said stiffener.

When the maneuvering handle 73 is to be maintained in its first, extended position the thumb nut 86 is tightened on the pivot pin 85 to lock the end of the arm 88 against pivotal movement between the legs 84 of the clip 81, as best shown in Fig. 1 of the drawing. However, when it is desired to collapse the cart 10 for transportation or other purposes, the thumb nut 86 is released to permit the end of the arm 88 to pivot between the legs 84 and the clip 81 so that the linkage 80 between the handle 73 and the transverse stiffener 16 of the frame 11 may be broken. The handle 73 is then moved toward the frame 11, such movement being accompanied by concomitant upward and pivotal movement of the lock 90, the clip 81 sliding upwardly on the tubular portion 74 of the handle 73 to permit such upward movement of the lock 90. The upward, pivotal movement of the lock 90 is accompanied by the movement of the burden-bearing platform 30 into its first, collapsed position against the frame 11. The collapsing of the cart 10 is so timed that the platform 30 is collapsed against the frame 11 before the lock 90 moves into the position shown in Fig. 3 of the drawing in which the base of the L-shaped element 92 engages the outer, or upper end of the platform 30, as best shown in Fig. 3 of the drawing, to prevent the platform 30 from returning to its second, burden-bearing position. To lock the parts of the cart 10 in their collapsed positions, the thumb nut 86 is tightened.

It can be readily seen that, by collapsing the burden-bearing platform 30 upwardly against the frame 11 and simultaneously moving the handle 73 into collapsed position against the frame 11, the handle 73 and the platform 30 are simultaneously locked securely against the frame 11 by means of the lock 90, thus preventing inadvertent movement of the platform 30 and the handle 73 from their collapsed to their extended positions.

Mounted on the rear edge of the platform is brake means 101 constituted by elongated, resilient brake members 103 which have arcuately curved outer ends adapted to engage the peripheries of the ground-contacting wheels 23 and 24 when the platform 30 is pivoted upwardly from its second to its first position. When the platform 30 is in its second, burden-bearing position, the brake members 103 extend outwardly from the rear of the platform in a substantially horizontal plane and are inoperative. However, when the platform 30 is pivoted upwardly to cause the platform to be moved into its first, collapsed position against the frame 11, the arcuately curved portions of the brake members 103 are carried downwardly into contact with the peripheries of the wheels 23 and 24, as best shown in Fig. 3 of the drawing, to prevent said wheels from rotating while the cart 10 is in collapsed condition. By thus providing automatically actuable brake means which is adapted to prevent the ground-contacting wheels 23 and 24 of the cart 10 from rotating when the cart 10 is in collapsed position, it is possible to lean the cart 10 against a wall, column or similar support without the possibility of the wheels rotating and permitting the cart to fall to the ground or floor while in collapsed condition. It will be noted that the various novel features of my invention such as the support means 36, the restraining means 50, the lock 90 and the brake means 101 all cooperate with one another to maintain the cart in collapsed condition in order that the transportation thereof be facilitated, in addition to performing other functions.

One of the greatest difficulties encountered in the utilization of carts of the character under consideration is the difficulty in lifting the cart and the burden thereupon over relatively high vertical obstacles such as curbings. In order to overcome this difficulty, my invention provides endless track means 106 which includes an arm 107 whose upper end is pivotally mounted on a clip 108 encompassing the tubular portion 74 of the handle 73. The arm 107 is affixed, at its lower end, to a transverse beam 110 to the opposite ends of which are fastened mounting lugs 112 on which are pivotally connected the upper ends of carriers 114 whose lower ends are pivotally secured to brackets 115 which, in turn, are secured to the lowermost ends of the tubes 13 and 14. Mounted at spaced points along the lengths of the carriers 114 are rollers 117 on which are supported endless track belts 119.

When the cart 10 is in extended position, as best shown in Fig. 1 of the drawing, the endless track belts 119 are disposed rearwardly of the ground-contacting wheels 23 and 24 with the lowermost portions of the belts immediately adjacent the ground-contacting wheels 23 and 24. Therefore, when a vertical obstacle such as a curb is encountered, instead of lifting the cart 10 bodily with the bag 64 thereupon, the endless track belts 119 are brought into contact with the curb and the belts 119 are caused to traverse the curb and carry the cart 10 over the curb, thus eliminating the necessity for lifting the cart and its burden bodily. This is a material advance over prior art carts because it facilitates the transportation of the cart and also eliminates the possibility of damaging the cart by undue strain thereupon or dropping the contents of the cart in the street.

When the cart 10 is in the extended position, as shown in Fig. 1 of the drawing, the mounting arm 107 of the endless track means 106 is locked in extended position by a thumb nut 121 associated with the mounting clip 108 and the endless track belts 119 are thus maintained in extended position for engagement with vertical obstacles. However, when it is desired to collapse the cart 10 into the position shown in Fig. 3 of the drawing, the thumb nut 121 is released permitting the upper end of the arm 107 to pivot freely in the clip 108 and thus permitting the entire endless track means 106 to be pivoted on the clip 108 and the bracket 115 into the substantially flush position against the handle 73 as shown in Fig. 3 of the drawing.

I thus provide by my invention a cart which is completely collapsible and the component elements of which are adapted to cooperate with one another when the cart is moved into its collapsed position so that the possibility of inadvertent return to extended position is avoided.

I claim as my invention:

1. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle pivotally supported on said frame; and a linkage for maintaining said handle in operative position on said frame, said linkage including a lock which is pivotally connected to said frame and which is operable by the movement of the handle from operative to inoperative positions to engage the platform as it is moved into said first position to maintain said platform against said frame in said first position.

2. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle supported on said frame; and brake means secured to and operable by movement of said platform into said first position for preventing rotation of said wheels to permit said cart to be disposed on said wheels while said cart is in collapsed condition.

3. In a collapsed cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle supported on said frame; and brake means mounted on said platform adjacent said wheels for engaging said wheels when said platform is moved into said first position to lock said wheels against movement to permit said cart to be disposed upon said wheels when in collapsed condition.

4. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle supported on said frame; and brake means mounted on said platform, said brake means including at least one brake element at the rear of said platform which is downwardly movable by the pivotal movement of said platform into said first position to engage the periphery of at least one of said wheels to retain it against rotation to prevent the inadvertent movement of said cart when in collapsed condition.

5. In a collapsible cart, the combination of: a frame; a plurality of ground-contacting wheels supported on an axle secured on said frame; a platform pivotally mounted on said frame and movable between a first position in which it is collapsed against said frame and a second, burden-bearing position in which it is disposed in a plane substantially normal to the vertical axis of said frame; a maneuvering handle supported on said frame; support means pivotally attached to said platform and movable between a first ground-contacting position and a second retracted position, said support means having elongated end portions engageable with said axle for retaining said support means in said ground-contacting position; and detent means on said platform for retaining said support means in either said ground-contacting or said retracted positions.

6. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle supported on said frame; supporting means pivotally secured to the under side of said platform and movable between a first, ground-contacting position and a second retracted position, said supporting means having elongated end portions engageable with said axle for retaining said supporting means in said ground-contacting position; and spring biased detent means for retaining said supporting means in either said ground-contacting or retracted positions.

7. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle supported on said frame; supporting means pivotally secured to the under side of said platform and movable between a first ground-contacting position and a second retracted position; and spring biased detent means for retaining said supporting means in either said ground-contacting or retracted positions, said detent means having portions projecting above the upper surface of said platform when said support means is positioned in said ground-contacting position for preventing the dislodgement of a burden from said platform.

8. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle supported on said frame; a lock pivotally mounted on said handle and rotatable thereby for engaging said platform when said platform is moved to said first position to maintain said cart in collapsed condition; and brake means mounted on said platform operable by the movement of said platform into said first collapsed position for preventing movement of said wheels while said cart is in collapsed condition to permit said cart to be rested on said wheels.

9. In a collapsible cart, the combination of: a frame; a plurality of ground-contacting wheels supported on said frame by an axle; a platform pivotally mounted on said frame and movable between a first position in which it is collapsed against said frame and a second, burden-bearing position in which it is disposed in a plane substantially normal to the vertical axis of said frame; a maneuvering handle supported on said frame; a lock on said handle for engaging said platform when said platform is moved to said first position to maintain said cart in collapsed condition; and supporting means pivotally attached to said platform and movable between a first ground-contacting position and a second retracted position, said supporting means having detent means formed thereupon for retaining said supporting means in said ground-contacting position, said detent means being constituted by sockets on the ends of said supporting means engageable with said axle.

10. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle supported on said frame; a lock on said handle for engaging said platform when said platform is moved to said first position to maintain said cart in collapsed condition; brake means on said frame operable by the movement of said platform into said first position for preventing movement of said wheels while said cart is in collapsed condition to permit said cart to be rested on said wheels; supporting means pivotally attached to said platform and movable between a first ground-contacting position and a second retracted position; and detent means on said platform for retaining said supporting means in either said first ground-contacting position or said retracted position.

11. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle pivotally supported on said frame; a linkage for maintaining said handle in operative position on said frame, said linkage including a lock which is pivotally connected to said frame and which is operable by the movement of the handle from operative to inoperative positions to engage the platform as it is moved into said first position to maintain said platform against said frame in said first position; and brake means mounted on said platform, said brake means including at least one element adjacent the rear end of said platform and movable downwardly by the pivotal movement of said platform into said first collapsed position for preventing rotation of at least one of said wheels to permit said cart to be rested on said wheels when in said collapsed position.

12. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle pivotally supported on said frame; a linkage for maintaining said handle in operative position on said frame, said linkage including a lock which is pivotally connected to said frame and which is operable by the movement of the handle from operative to inoperative positions to engage the platform as it is moved into said first position to maintain said platform against said frame in said first position; supporting means pivotally secured to the under side of said platform and movable between a first ground-contacting position and a second retracted position; and spring biased detent means for retaining said supporting means in either said ground-contacting position or said retracted position.

13. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle pivotally supported on said frame; a linkage for maintaining said handle in operative position on said frame, said linkage including a lock which is pivotally connected to said frame and which is operable by the movement of the handle from operative to inoperative position to engage the platform as it is moved into said first position to maintain said platform against said frame in said first position; brake means mounted on said platform, said brake means including at least one element adjacent the rear end of said platform and movable downwardly by the pivotal movement of said platform into said first collapsed position for preventing rotation of at least one of said wheels to permit said cart to be rested on said wheels when in said collapsed position; supporting means pivotally secured to the under side of said platform and movable between a first ground-contacting position and a second retracted position; and spring biased detent means for engaging said supporting means to retain said supporting means in either said ground-contacting or retracted positions.

14. In a collapsible cart, the combination of: a frame; a plurality of ground-contacting wheels supported on said frame; a platform pivotally mounted on said frame and movable between a first position in which it is collapsed against said frame and a second, burden-bearing position in which it is disposed in a plane substantially normal to the vertical axis of said frame; a maneuvering handle pivotally supported on said frame; and endless track means pivotally mounted at its lower end on said frame and at its upper end from said handle for facilitating the movement of said cart past vertical obstructions, said pivoted mountings permitting said track to be moved by pivoting said handle from extended to retracted positions on said frame.

References Cited in the file of this patent

UNITED STATES PATENTS

| 1,105,379 | Schulze | July 28, 1914 |
| 1,950,274 | Sullivan | Mar. 6, 1934 |
| 2,259,924 | Connolly | Oct. 21, 1941 |
| 2,296,193 | Siebert | Sept. 15, 1942 |
| 2,305,719 | Lee | Dec. 22, 1942 |
| 2,458,924 | Baker | Jan. 11, 1949 |